Nov. 10, 1936. T. STIEBEL 2,060,644
ELECTRIC IMMERSION HEATER
Filed Jan. 9, 1936
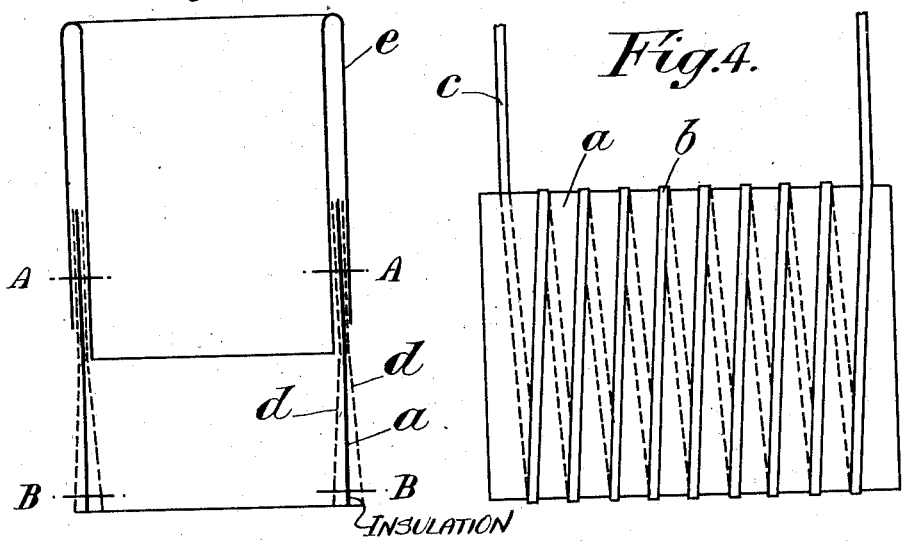
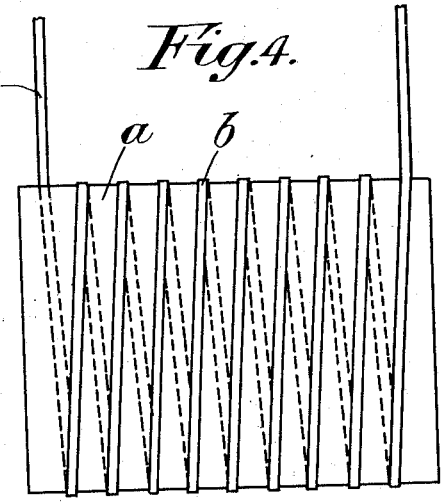
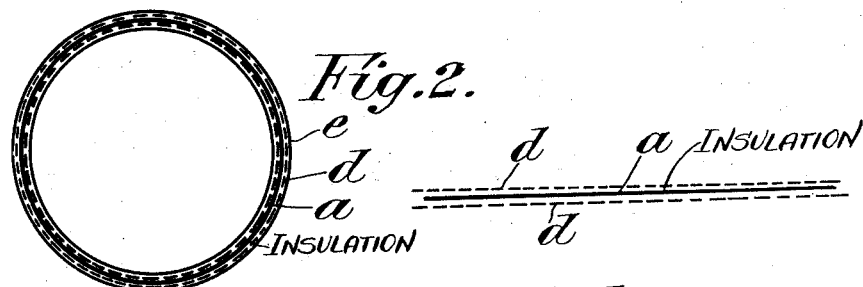
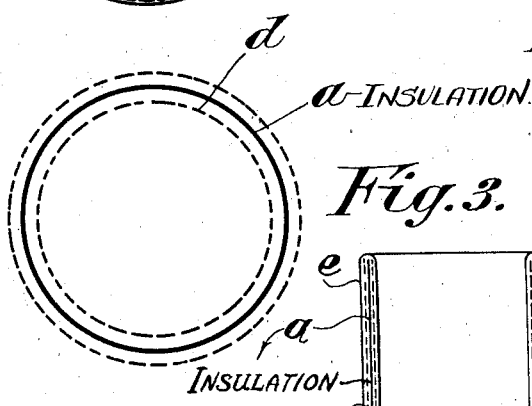
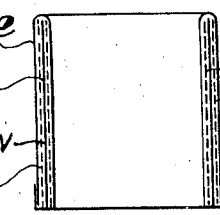
INVENTOR
T. Stiebel
Attorney Patented Nov. 10, 1936

2,060,644

UNITED STATES PATENT OFFICE 2,060,644

ELECTRIC IMMERSION HEATER

Theodor Stiebel, Berlin-Tempelhof, Germany

Application January 9, 1936, Serial No. 58,244
In Germany March 27, 1935

8 Claims. (Cl. 201—67)

This invention relates to electric immersion heaters and more particularly a ring shaped immersion heater consisting of a double walled cylindrical element wherein the annular chamber formed between the two cylindrical walls is closed on all sides and accommodates a heating element insulated on both sides.

According to the invention the heating element is formed of a rectangular mica plate around which is coiled a resistance wire or band and on each side of which is arranged a relatively thin mica sheet possessing high heat resistance, the associated parts being bent into cylindrical shape and forced into the annular space formed between the outer and inner walls of a double walled cylindrical element. The relative widths of said annular space and the heating element with its mica insulating sheets, are such that when inserted into said annular space the thin mica sheets are pressed tightly against each side of the mica plate carrying the resistance wire by the outer and inner walls of the metal cylinder, thus the greater part of the air is expelled. In order to obtain even greater surface pressure and thus completely eliminate air, which may still exist between the heating element and its insulating mica sheets, a pressure acting radially on all sides is exerted on the inner surface of the inner wall of the metal cylinder. The degree of this applied pressure is such that the inner wall of the cylinder is expanded beyond its limit of elasticity. This expansion of the inner wall may cause the outer wall to expand also, but it is important that the outer wall of the cylinder should not be expanded beyond its yield point or at least beyond its limit of elasticity, so that when the applied pressure ceases the outer wall, owing to its intrinsic tensional stresses, tends to return to its original dimensions, while the inner wall, which is already expanded beyond its limit of elasticity, retains its expanded dimensions so that the annular space between the inner and outer walls of the cylinder is reduced, with the result that the outer wall of the cylindrical member continually exerts a pressure on the heating elements and its insulations located within the annular space. This compression of the heating element has an important effect both on the life and the operation of the heater in that insulating air layers are avoided and consequently the maximum amount of heat is transmitted to the liquid in which the heater is immersed, also the specific temperature of the resistance coil or band remains relatively low, even in the event of the heater being energized when not immersed in a liquid, so that the effect of the heater and its life are considerably increased.

In order to avoid insulating air layers in the annular space containing the heating element proper, it has already been proposed to evacuate said space, but this operation considerably increases the cost of production. Moreover, it is well known that evacuated spaces or chambers are mostly imperfect and in any case fulfill their purpose for only a short period of time.

Various ways have also been proposed for exerting external pressure on both sides of the heating element proper after said heating element has been introduced into the annular space formed by the walls of a double walled cylinder thus to produce subsequent pressure. For example it has been proposed to exert hydraulic pressure on both sides of the double walled cylinder containing the heating element proper, and it has also been proposed to achieve the desired result by placing the ring shaped heater in a rubber gauge and inserting a rubber ring within the ring-shaped heater, and then exerting a pressure from above on both rubber elements whereby pressure is exerted on said ring shaped heating element perpendicularly thereto. All these methods are however, unsatisfactory since only the central portions of the sides of the ring shaped heater are subject to any appreciable amount of pressure and when the initial applied pressure ceases the expanded sides return to their initial positions.

All these disadvantages are overcome by the present invention which will now be described more fully with reference to the accompanying drawing in which Figure 1 is a vertical section through an electric immersion heater according to the invention, Fig. 2 is a cross-section on the line A—A of Fig. 1, Fig. 3 is a cross-section on the line B—B of Fig. 1, Fig. 4 is a plan view of the rectangular mica plate with a resistance band wound thereon, Fig. 5 is a side view of mica plate shown in Fig. 4 but with thin mica sheets arranged on each side thereof, and Figure 6 is a sectional view of the heater assembled.

Referring to this drawing the ring shaped immersion heater consists of a double walled metal cylindrical member $e$, having a heating element proper located within the annular space formed between the walls of said cylindrical member.

The heating element proper consists of a plate $a$ of a material, such as amber mica, which has a high calcining point and which has good insulting properties even at high temperatures, and around which is wound a resistance wire or band b, for example of chrome-nickel, the ends c of which are connected with the electric source. The mica plate a with the winding b is covered on both sides with relatively thin insulating sheets d preferably of the same material as the plate a. The whole structure is then bent into cylindrical form and in this condition, forced into the annular space formed between the two walls of the cylindrical member e. The insulating cover sheets d preferably consist of amber mica or a material of similar composition and crystalline structure. The relative widths of the annular space in the member e and the composite elements a, b, c is such that when the element a, b, c is forced into said annular space it fits tightly so that the mica sheets are pressed tightly together and also press against the inner and outer walls of the member e.

The cylindrical member e consists preferably of copper, or an alloy in which copper predominates, but in any case the material must be selected according to its limits of elasticity or expansion. It is possible by suitably selecting the dimensions of the inner and outer walls to obtain the desired result with great accuracy. The inner wall may also be thicker than the outer wall whereby the inner wall can be prevented from bulging inwards by the pressure exerted by the outer wall if the heater should inadvertently become dry whilst in use. It is also possible to make the inner wall of a material whose limit of elasticity is less than that of the outer wall so that the outer wall becomes expanded to only a slight extent when the inner wall is expanded to its limit of elasticity.

The manner in which pressure is applied to the inner wall of the ring-shaped element is immaterial but is applied preferably by a spreading mandrel.

The ring-shaped member e may be constructed in any suitable manner, for example it may be formed by means of two separate concentric tubes connected together at the upper ends, and subsequently bending over and soldering the slightly longer inner wall at the lower end, or a double walled metal sleeve opened at one end and produced by a drawing process, in which case the one open edge or wall is bent over and soldered after the insertion of the heating element. The ring-shaped heater thus produced is subsequently mounted on a holder and finally subjected to the expanding treatment above described, in order to obtain a still greater surface pressure.

Immersion heaters constructed according to the present invention are capable of withstanding temperatures up to 900° C. (which might occur owing to the absence of liquid) without any detrimental effect. Owing to good radiation no accumulation of heat occurs in the interior of the heater so that the specific temperature of the heating resistance is only slightly higher than the external temperature of the heater and consequently there is less danger of the resistance wire or band burning out.

What I claim and desire to secure by Letters Patent is:—

1. An electric immersion heater comprising a double walled cylindrical member of heat conducting material, and a heating element composed of a rectangular plate of material having a high calcining point and good heat insulating properties, a resistance wire wound round said plate and relatively thin insulating sheets arranged on each side of said plate to cover the resistance wire, said heating element being bent into cylindrical form and inserted into the annular space of the cylindrical member, and the inner wall of the cylindrical member being finally subjected to an outward radial pressure to expand said wall beyond its limit of elasticity and expand the outer wall within its limit of elasticity to maintain the heating element under pressure in the cylindrical member.

2. An electric immersion heater according to claim 1, wherein the plate carrying the resistance wire and the covering sheets are composed of amber mica and the double walled cylindrical member consists of copper.

3. An electric immersion heater according to claim 1 wherein the inner wall of the double walled cylindrical member is of greater thickness than the outer wall to prevent the inner wall bulging inwardly by pressure exerted by the outer wall caused by the drying of the heater.

4. An electric immersion heater according to claim 1, wherein the inner wall of the ring shaped heating element is composed of a material having a lower limit of elasticity than that of the material of the outer wall.

5. In an electric immersion heater, a double walled cylindrical member, a heating element engaged in the space between the walls of the cylindrical member, and sheets of electric insulating material interposed between the walls of the cylindrical member and the heating element, the cylindrical member being radially expanded to force the inner wall thereof beyond its limit of elasticity and the outer wall within its limit of elasticity whereby the heating element is maintained under pressure in the cylindrical member.

6. In an electric immersion heater, a double walled cylindrical member having the walls connected at one end, a heating element engaged in the space between the walls of the cylindrical member, and sheets of electric insulating material interposed between the walls of the cylindrical member and the heating element, the free end of one of the walls of the cylindrical member being folded over the free end of the other wall to enclose the heating element and electric insulating sheets in the space between the walls of the cylindrical member, and the cylindrical member being radially expanded to force the inner wall thereof beyond its limit of elasticity and the outer wall within its limit of elasticity whereby the heating element is maintained under pressure in the cylindrical member.

7. An electric immersion heater as claimed in claim 6, wherein the free end of the inner wall extends beyond the free end of the outer wall of the cylindrical member to permit the folding of the free end of the inner wall over the free end of the outer wall and close the space between the walls of the cylindrical member.

8. An electric immersion heater comprising a double walled cylindrical member, and a heating element composed of a plate of electric and heat insulating material, electric resistance wire wound around said plate and electric insulating sheets arranged on each side of said plate to cover the resistance wire, said heating element being engaged in the space between the walls of the cylindrical member and the cylindrical member being radially expanded to force the inner wall thereof beyond its limit of elasticity and the outer wall within its limit of elasticity whereby the heating element is maintained in the space of the cylindrical member under pressure.

THEODOR STIEBEL.